United States Patent
Kim (10) Patent No.: US 7,859,183 B2
(45) Date of Patent: Dec. 28, 2010

(54) FLAT LIGHT EMITTING LAMP CAPABLE OF EMITTING LIGHT FROM THE SIDE THEREOF AND LIQUID CRYSTAL DISPLAY DEVICE HAVING THE SAME

(75) Inventor: Young Mi Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 744 days.

(21) Appl. No.: 11/157,981

(22) Filed: Jun. 22, 2005

(65) Prior Publication Data

US 2006/0001795 A1    Jan. 5, 2006

(30) Foreign Application Priority Data

Jun. 30, 2004 (KR) .............................. P2004-50438

(51) Int. Cl.
  *H01J 63/04* (2006.01)
  *H01J 1/62* (2006.01)

(52) U.S. Cl. .................. 313/493; 313/491; 313/484; 313/292; 313/634; 313/487; 349/70; 349/71

(58) Field of Classification Search ................ 313/493, 313/634, 292, 491
See application file for complete search history.

(56) References Cited

U.S. PATENT DOCUMENTS

| | | | | |
|---|---|---|---|---|
| 4,641,226 A | * | 2/1987 | Kratz | ............................ 362/218 |
| 4,767,965 A | * | 8/1988 | Yamano et al. | ............. 313/491 |
| 4,945,281 A | | 7/1990 | Ipson | |
| 5,233,262 A | | 8/1993 | Lynn et al. | |
| 5,329,203 A | * | 7/1994 | Jeong | ............................ 313/491 |
| 5,461,279 A | * | 10/1995 | Hasegawa | ................... 313/493 |
| 5,811,925 A | * | 9/1998 | Anandan et al. | ............ 313/493 |
| 6,100,635 A | | 8/2000 | Winsor | |
| 6,255,782 B1 | * | 7/2001 | Kuroda et al. | ............ 315/169.1 |
| 6,590,319 B2 | | 7/2003 | Moon | |
| 7,141,931 B2 | * | 11/2006 | Park et al. | ................... 313/607 |
| 7,294,957 B2 | * | 11/2007 | Kim et al. | ................... 313/491 |
| 2002/0064037 A1 | | 5/2002 | Lee | |

FOREIGN PATENT DOCUMENTS

| | | |
|---|---|---|
| DE | 10149194 | 6/2002 |
| DE | 10205903 | 10/2002 |
| DE | 10203834 | 8/2003 |
| JP | 62-194247 | 8/1987 |
| JP | 4-067557 | 3/1992 |
| JP | 9-102297 | 4/1997 |
| JP | 11-007916 | 1/1999 |
| JP | 11167119 A | * 6/1999 |

(Continued)

*Primary Examiner*—Sikha Roy
(74) *Attorney, Agent, or Firm*—Mceknna Long & Aldridge LLP (57) ABSTRACT

A flat-type fluorescent lamp includes upper and lower glass substrates facing each other; a spacer glass having a zigzag shape between the upper and lower glass substrates for providing a plurality of discharge areas; first and second electrode parts at ends of the upper and lower glass substrates along a longitudinal direction thereof; first and second reflective sheets respectively formed on upper and lower surfaces of the spacer glass; and a plurality of first fluorescent substances formed on the upper glass substrate and a plurality of second fluorescent substances formed on the lower glass substrate.

11 Claims, 9 Drawing Sheets

FOREIGN PATENT DOCUMENTS

| | | | |
|---|---|---|---|
| JP | 2001059961 A * | 3/2001 |
| JP | 2001-126669 A | 5/2001 |
| JP | 2001-160656 | 6/2001 |
| JP | 2002-075286 | 3/2002 |
| JP | 2002258284 | 9/2002 |

* cited by examiner

FLAT LIGHT EMITTING LAMP CAPABLE OF EMITTING LIGHT FROM THE SIDE THEREOF AND LIQUID CRYSTAL DISPLAY DEVICE HAVING THE SAME

This application claims the benefit of Korean Patent Application No. 2004-50438, filed on Jun. 30, 2004, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device with a flat-type fluorescent lamp capable of emitting light from both sides thereof.

2. Discussion of the Related Art

Cathode ray tubes (CRTs) have been widely used for monitors of televisions, measuring machines and information terminals. However, the CRTs cannot satisfy the demand for miniaturization and lightweight display devices. Thus, display devices such as liquid crystal display (LCD) devices that use an electro-optical effect, plasma display panel (PDP) devices that use a gas discharge, and electroluminescence display (ELD) device that use an electric-field-luminous effect have been developed to replace the CRTs.

Among the display devices, LCD devices have been most actively studied and developed because of such advantages as compact size, lightweight and low power consumption. Thus, LCD devices have become suitable for ultra-thin flat display devices, for example, monitors for spacecrafts, aircrafts, notebook computers, laptop computers, desktop computers and large-sized display devices, and the demand for LCD devices continuously increases.

Most LCD devices display images by controlling the transmittance of light. Thus, these LCD devices require an additional light source such as a backlight unit. In general, such a backlight unit has a cylindrical fluorescent lamp and is classified into two types, the direct type and the edge type, according to the arrangement of the fluorescent lamp.

In the edge-type backlight unit, a lamp unit is provided at one side of a light-guiding plate. The lamp unit includes a lamp for emitting light, a lamp holder inserted into both ends of the lamp for protecting the lamp, and a reflective sheet for reflecting the light emitted from the lamp toward the light-guiding plate. One side of the reflective sheet is inserted into the light-guiding plate and surrounds the circumference of the lamp. The edge-type backlight unit is generally used in relatively small-sized LCD devices for the monitors of laptop computers and desktop computers, and has such advantages as good uniformity, long life span, and thin profile.

In the direct-type backlight unit, a plurality of lamps are formed on a lower surface of a light-diffusion sheet, whereby an entire surface of the LCD panel is directly illuminated with the light. Because the direct-type backlight unit has greater light efficiency compared with the edge-type backlight unit, it is generally used in large-sized LCD devices (i.e., greater than twenty inches) which require high luminance. That is, LCD devices including such a direct-type backlight unit are generally used for large-sized monitors or televisions. When such a large-sized monitor or television that includes the direct-type backlight unit is turned on for a long time, some of the lamps inside the backlight unit may break down.

In case of an LCD device with the edge-type backlight unit, when one of the lamps breaks down, the LCD device can display images without a major problem, although the luminance of the LCD device is slightly degraded. However, in case of an LCD device with the direct-type backlight unit, a plurality of lamps are provided underneath a screen of the LCD panel. Accordingly, when one of the lamps breaks down due to trouble with the lamp or the end of the lamp life, the portion of the screen corresponding to the malfunctioning lamp portion becomes darker than the surrounding portions of the screen. Thus, the direct-type LCD device is required to have a simple structure suitable for disassemble and assemble of the lamp unit.

Hereinafter, a backlight unit according to the related art will be described with reference to the accompanying drawings.

Figure 1:
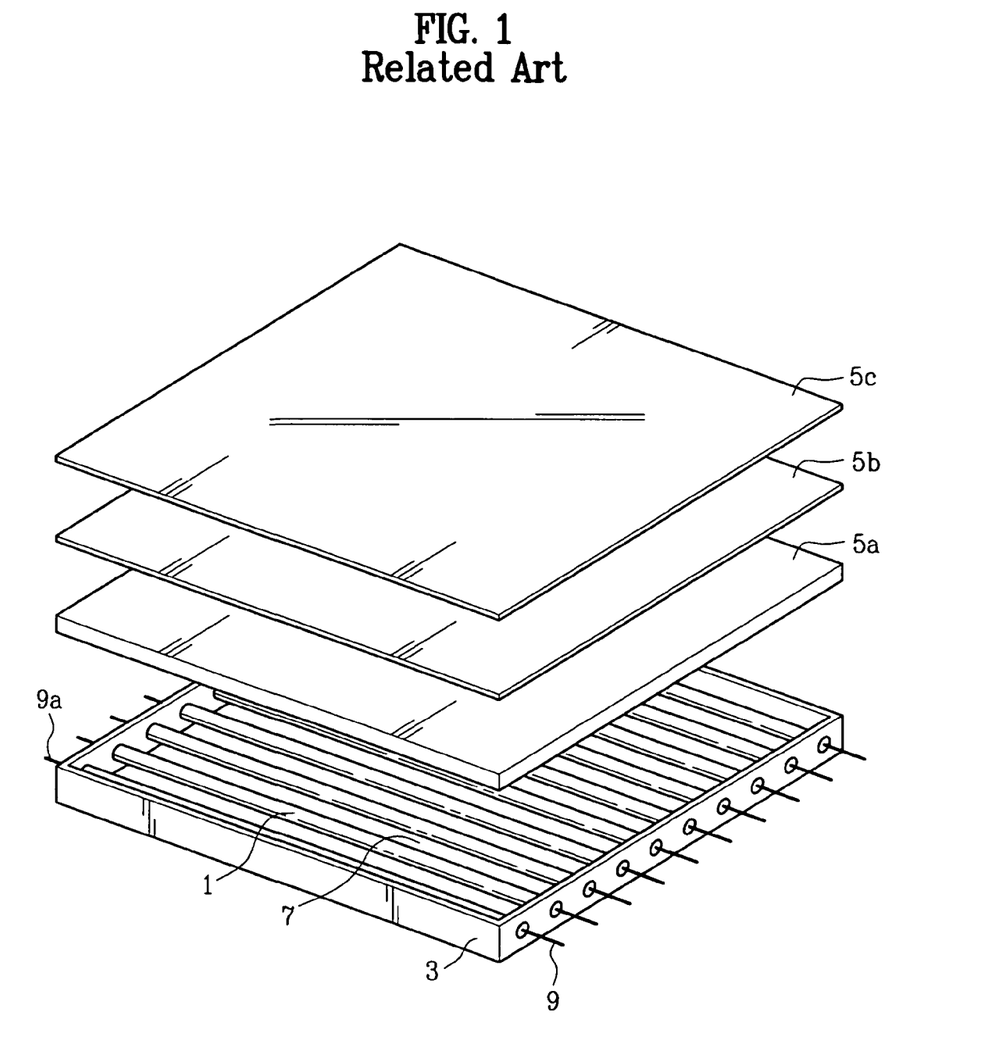
FIG. 1 is a perspective view illustrating a direct-type backlight unit according to the related art.

FIG. 1 is a perspective view illustrating a direct-type backlight unit according to the related art. As illustrated in FIG. 1, the direct-type backlight unit includes a plurality of fluorescent lamps 1, an outer case 3 and light-scattering means 5*a*, 5*b* and 5*c*. The plurality of fluorescent lamps 1 are arranged at fixed intervals along one direction, and the outer case 3 fixes and supports the plurality of fluorescent lamps 1. The light-scattering means 5*a*, 5*b* and 5*c* are provided between the fluorescent lamps 1 and an LCD panel (not shown).

The light-scattering means 5*a*, 5*b* and 5*c* provide a uniform luminance to the LCD panel and prevent the silhouette of the fluorescent lamps 1 from being shown on the display surface of the LCD panel. In order to improve the light-scattering effect, a plurality of diffusion sheets and one diffusion plate may be provided between the fluorescent lamps 1 and the LCD panel. Also, a reflective sheet 7 is provided on an inner surface of the outer case 3 for directing the light emitted from the fluorescent lamps 1 toward the LCD panel, thereby improving the light efficiency.

Cold Cathode Fluorescent Lamps (CCFL) are used as the fluorescent lamps 1. Specifically, electrodes are provided at both ends of a tube in each of the fluorescent lamps 1. Accordingly, when a voltage is applied to the electrodes of the fluorescent lamp 1, the fluorescent lamp 1 emits light. Also, each end of the fluorescent lamp 1 is inserted into a hole formed on a side of the outer case 3. Then, both electrodes of the fluorescent lamp 1 are connected with power supplying wires 9 and 9*a* for operating the fluorescent lamp 1. Also, the power supplying wires 9 and 9*a* are connected with a driving circuit through an additional connector. Thus, each fluorescent lamp 1 requires an individual connector.

In the aforementioned direct-type backlight unit according to the related art, when a voltage is applied to both electrodes of the fluorescent lamp 1 through the power supplying wires 9 and 9*a*, the fluorescent lamp 1 emits light. Accordingly, the LCD panel is directly irradiated with the light emitted from the fluorescent lamp 1 through the reflective sheet 7 and the light-scattering means 5*a*, 5*b* and 5*c*.

Figure 2:
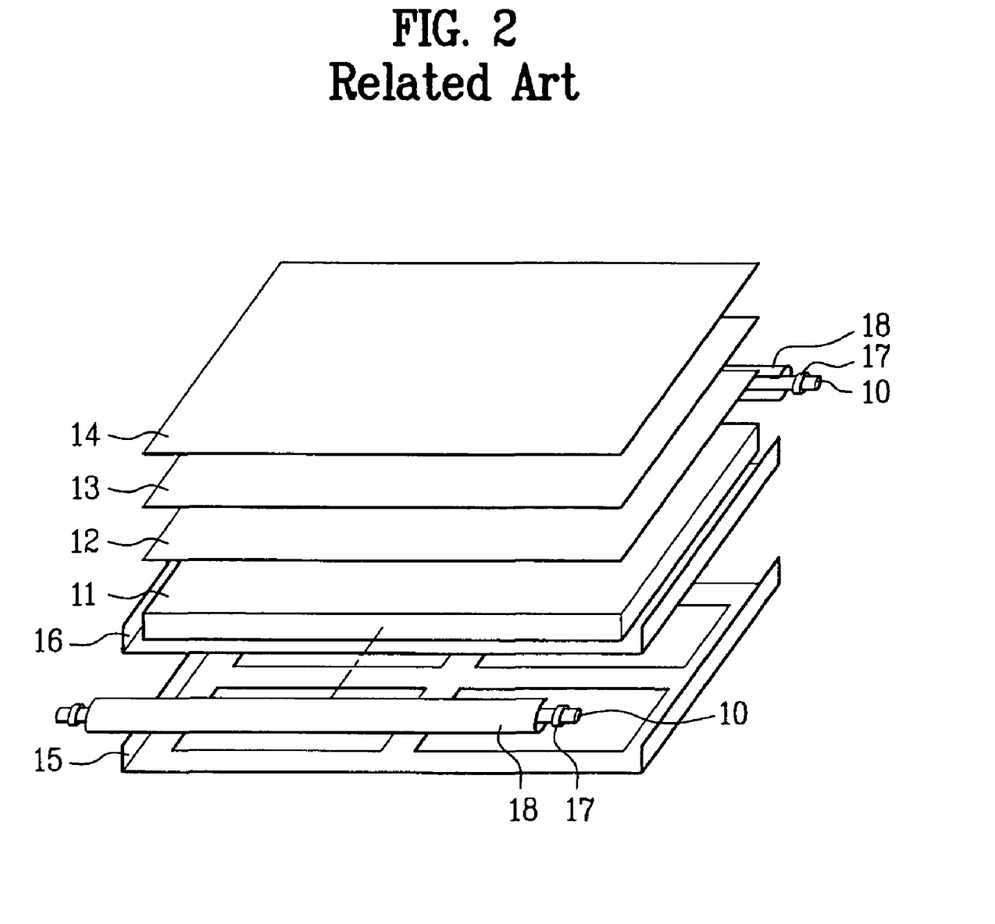
FIG. 2 is a perspective view illustrating an edge-type backlight unit according to the related art.

FIG. 2 is a perspective view illustrating an edge-type backlight unit according to the related art. As illustrated in FIG. 2, the edge-type backlight unit includes an LCD panel 14, a lamp 10, a light-guiding plate 1, a light-diffusion sheet 12, a prism sheet 13, a fixation structure 15, and a lower reflective sheet 16.

The LCD panel 14 displays images by controlling the transmittance of the light emitted from the lamp 10 that is used as a light source. The light-guiding plate 1 guides the light emitted from the lamp 10 toward the LCD panel 14. The light-diffusion sheet 12 diffuses the light guided by the light-guiding plate 1 to a predetermined angle. The prism sheet 13 concentrates the diffused light and directs the concentrated light toward the rear of the LCD panel 14. The fixation structure 15 is positioned below the light-guiding plate 1. To minimize light loss, the lower reflective sheet 16 reflects the light traveling toward the fixation structure 15 to the LCD panel 14.

The edge-type backlight unit according to the related art further includes lamp reflective sheets 18 and lamp holders 17. Each of the lamp reflective sheets 18 covers the lamp 10 except for a surface of the lamp facing the light-guiding plate 1, thereby decreasing light loss. The lamp holders 17 are positioned at both ends of the lamp 10 to support the lamp 10 and to maintain a predetermined interval between the light-guiding plate 1 and the lamp 10. A plurality of light-diffusion sheets and prism sheets may be provided between the LCD panel 14 and the light-guiding plate, instead of a single pair of light-diffusion sheet and prism sheet. The light emitted from the lamps 10 of the edge-type backlight unit is transmitted to the LCD panel through the light-guiding plate, the light-diffusion sheet and the prism sheet.

In the edge-type backlight unit according to the related art, the lamps 10 are positioned at both sides of the light-guiding plate 1. Such an edge-type backlight unit is generally used for large-sized monitors. However, when the edge-type backlight unit is used for a small-sized notebook computer, a single lamp may be positioned at any one side of the light-guiding plate 1.

The related art direct-type and edge-type backlight units can be used for notebook computers or monitors. However, when such related art backlight units are used for display devices that can display images on both sides, two LCD modules, each of which has a backlight unit, are required to construct such dual-emission display devices, thereby complicating the structure and increasing the thickness of the dual-emission display devices.

SUMMARY OF THE INVENTION

Accordingly, the present invention is directed to a flat-type fluorescent lamp and a liquid crystal display (LCD) device having the same that substantially obviate one or more problems due to limitations and disadvantages of the related art.

An advantage of the present invention is to provide a flat-type fluorescent lamp and an LCD device having the same, in which the flat-type fluorescent lamp can emit light from both sides thereof.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the present invention, as embodied and broadly described herein, a flat-type fluorescent lamp includes upper and lower glass substrates facing each other; a spacer glass having a zigzag shape between the upper and lower glass substrates for providing a plurality of discharge areas; first and second electrode parts at ends of the upper and lower glass substrates along a longitudinal direction thereof; first and second reflective sheets respectively formed on upper and lower surfaces of the spacer glass; and a plurality of first fluorescent substances formed on the upper glass substrate and a plurality of second fluorescent substances formed on the lower glass substrate.

In another aspect of the present invention, a liquid crystal display (LCD) device includes a flat-type fluorescent lamp, wherein the flat type fluorescent lamp includes upper and lower glass substrates facing each other, a spacer glass having a zigzag shape between the upper and lower glass substrates for providing a plurality of discharge areas, first and second electrode parts at ends of the upper and lower glass substrates along a longitudinal direction thereof, first and second reflective sheets respectively formed on upper and lower surfaces of the spacer glass, and a plurality of first fluorescent substances formed on the upper glass substrate and a plurality of second fluorescent substances formed on the lower glass substrate; a first light-scattering means and a first LCD panel over the flat-type fluorescent lamp; and a second light-scattering means and a second LCD panel below the flat-type fluorescent lamp.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, a flat-type fluorescent lamp according to an embodiment of the present invention will be described with reference to the accompanying drawings.

Figure 3:
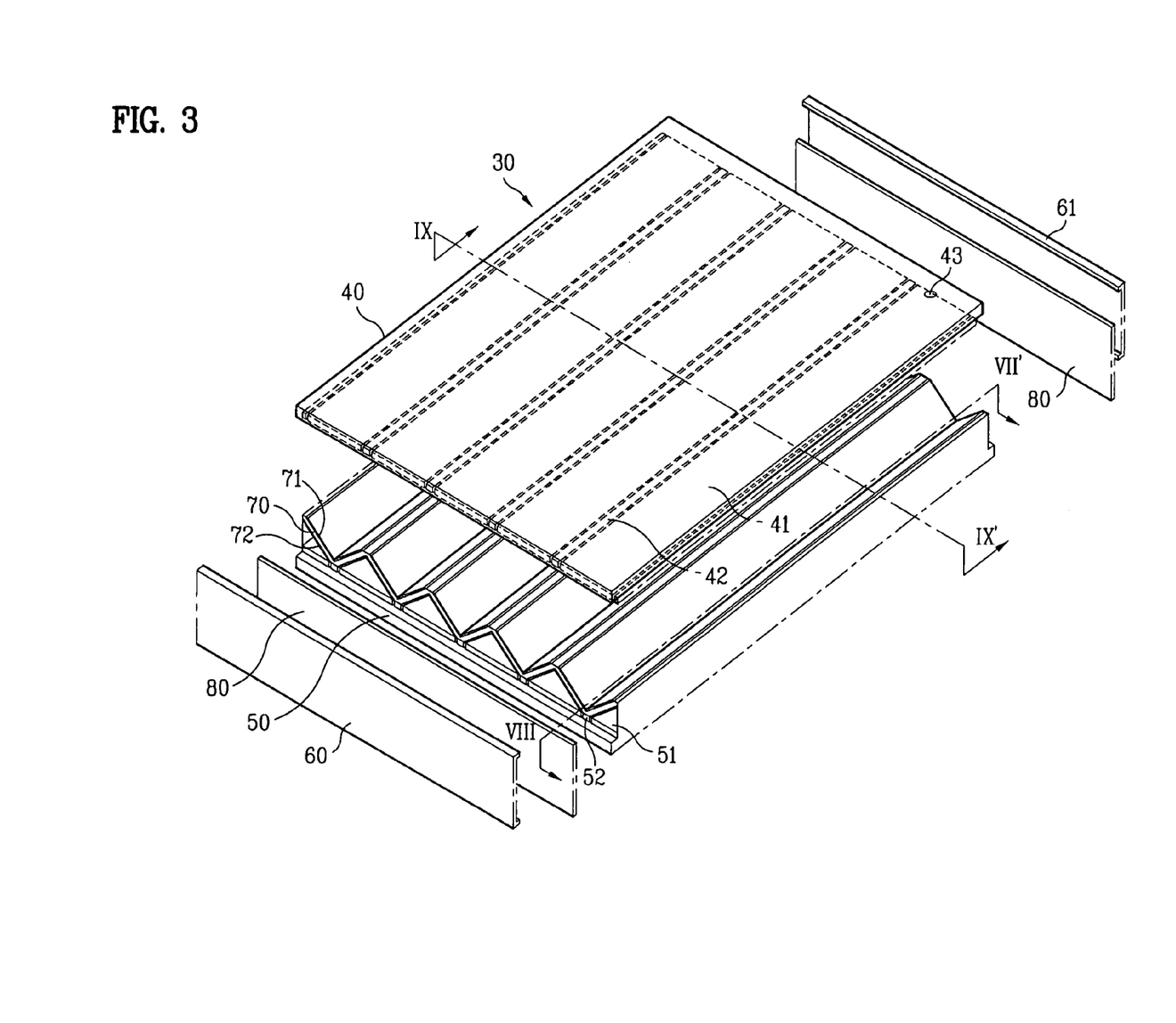
FIG. 3 is a perspective view illustrating a flat-type fluorescent lamp according to the present invention.
Figure 4:
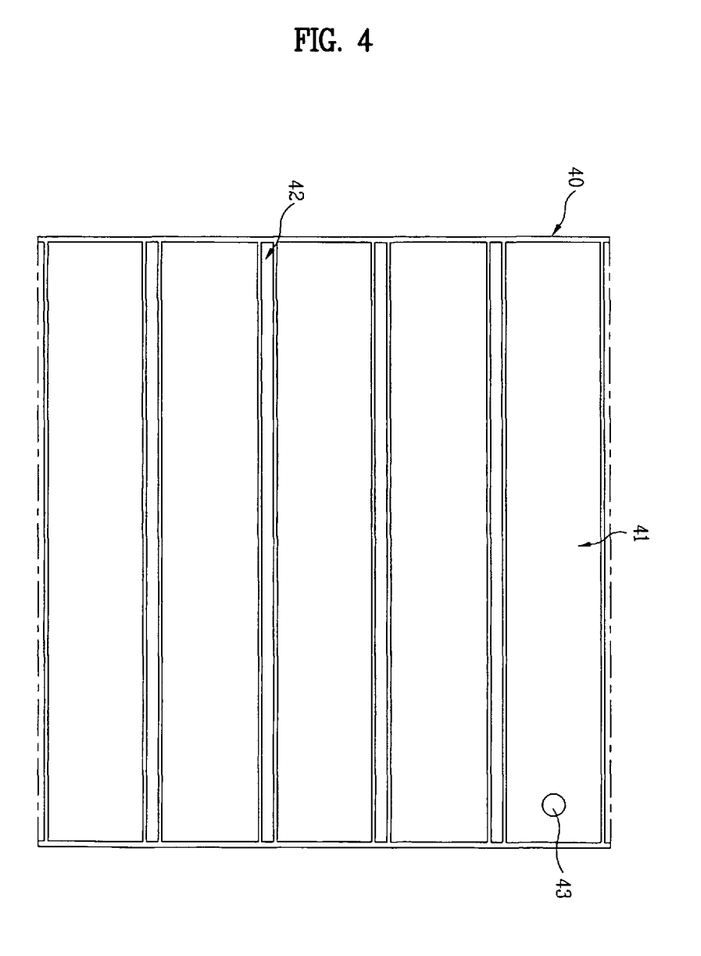
FIG. 4 is a plane view illustrating a upper glass substrate of FIG. 3.
Figure 5:
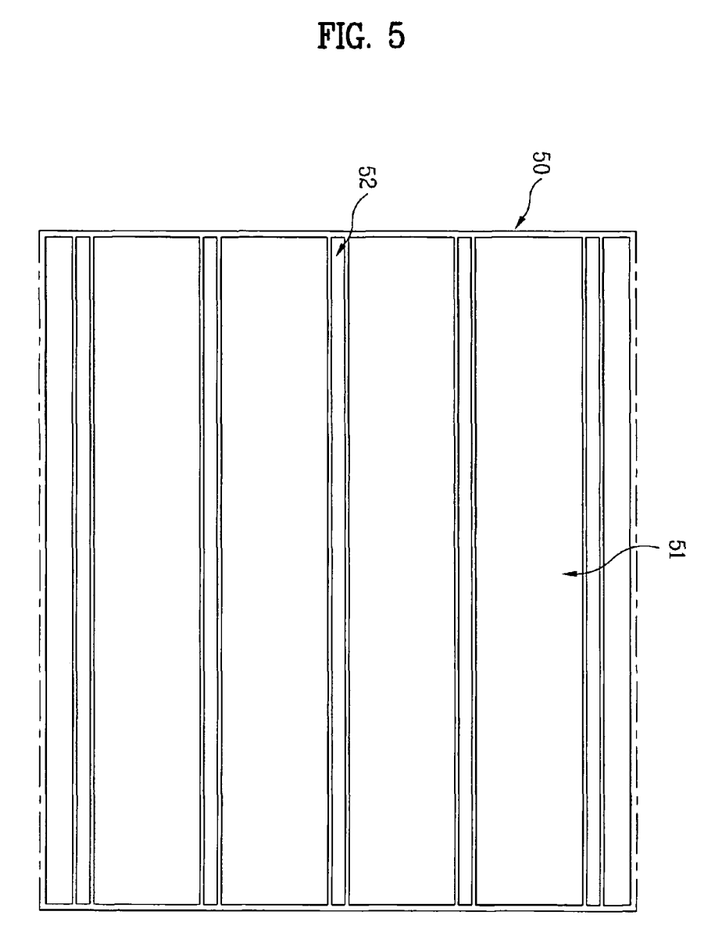
FIG. 5 is a plane view illustrating a lower glass substrate of FIG. 3.
Figure 6A:
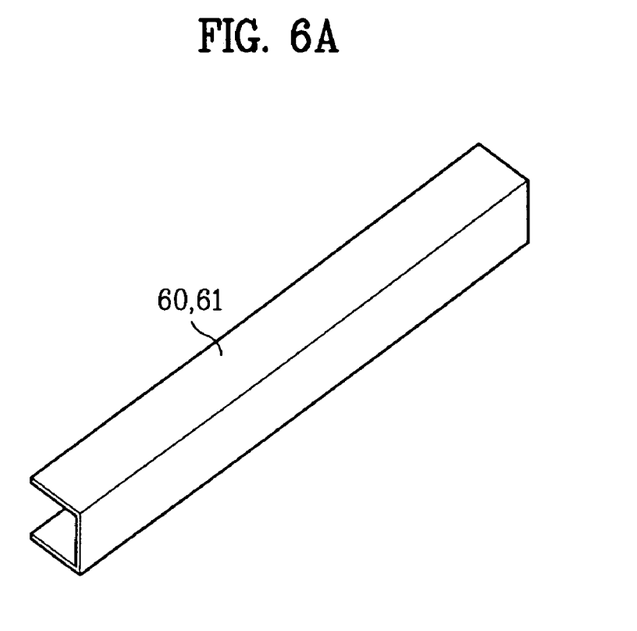
FIG. 6A is a perspective view illustrating first and second electrode parts according to an embodiment of the present invention.
Figure 6B:
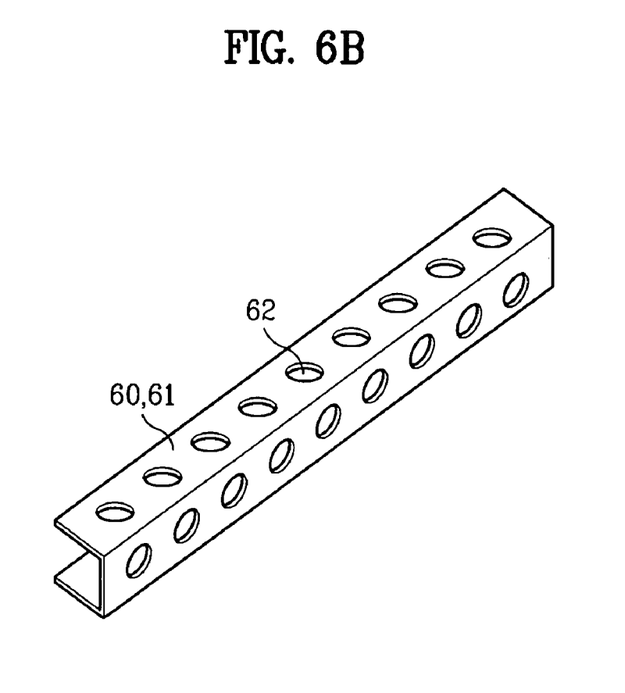
FIG. 6B is a perspective view illustrating first and second electrode parts according to another embodiment of the present invention.
Figure 7:
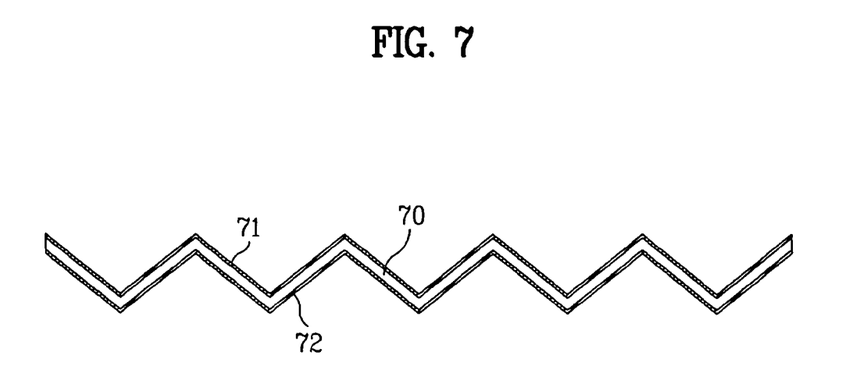
FIG. 7 is a cross-sectional view illustrating a spacer glass of a flat-type fluorescent lamp according to the present invention.
Figure 8:
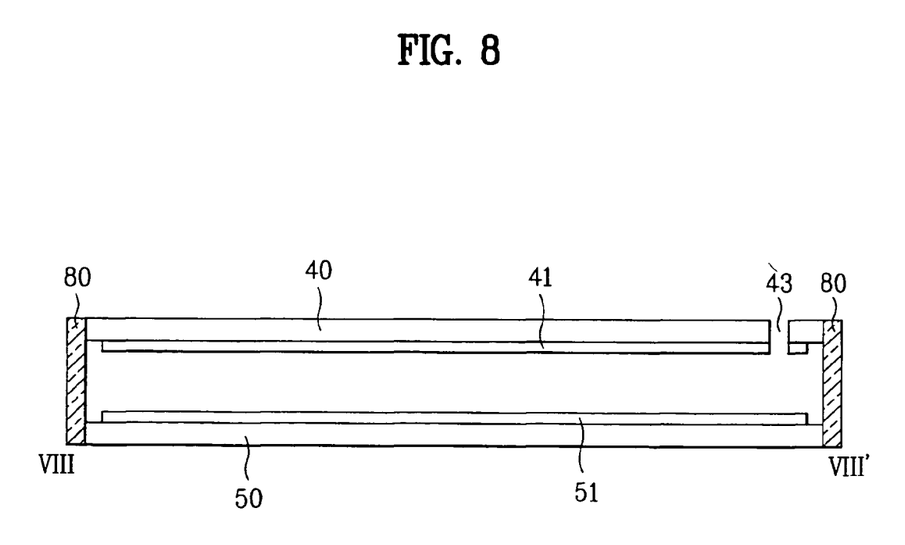
FIG. 8 is a cross-sectional view along the line VIII-VIII' of FIG. 3.
Figure 9:
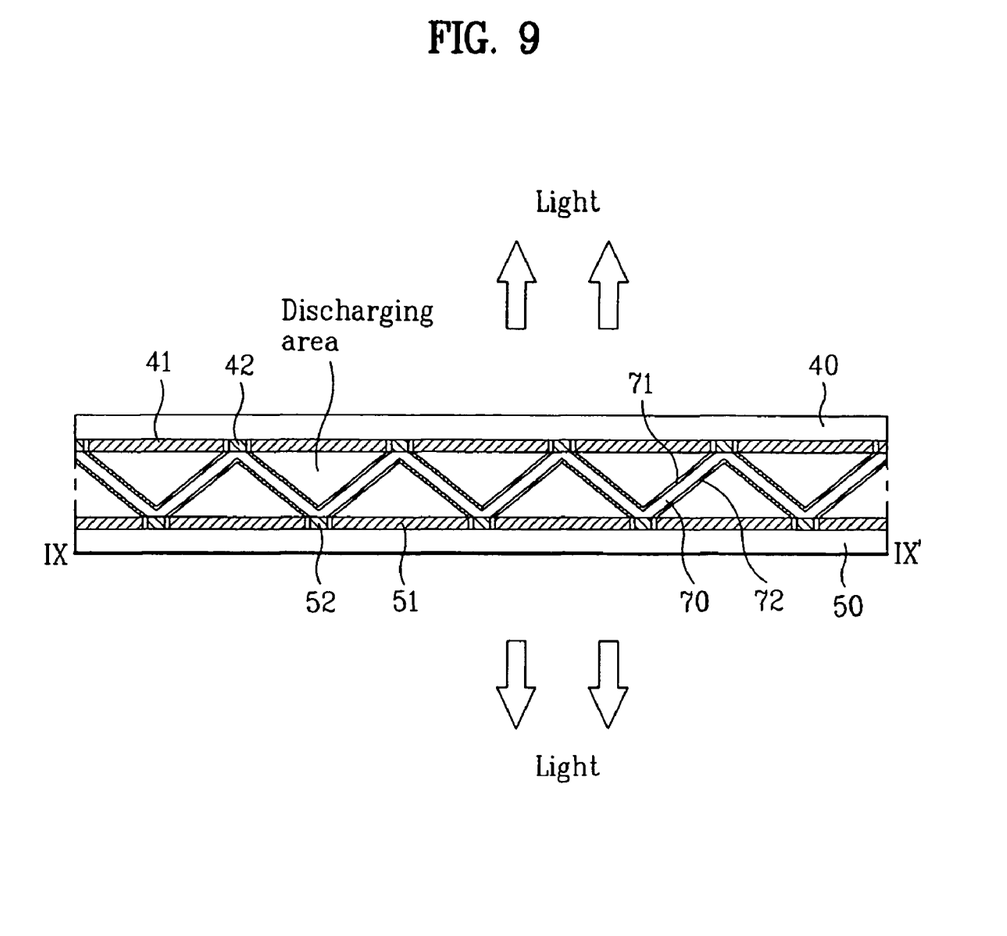
FIG. 9 is a cross-sectional view along the line IX-IX' of FIG. 3.

FIG. 3 is a perspective view illustrating a flat-type fluorescent lamp according to the present invention. FIG. 4 is a plane view illustrating a upper glass substrate of FIG. 3. FIG. 5 is a plane view illustrating a lower glass substrate of FIG. 3. FIG. 6A is a perspective view illustrating first and second electrode parts according to an embodiment of the present invention. FIG. 6B is a perspective view illustrating first and second electrode parts according to another embodiment of the present invention. FIG. 7 is a cross-sectional view illustrating a spacer glass of a flat-type fluorescent lamp according to the present invention. FIG. 8 is a cross-sectional view along the line VIII-VIII' of FIG. 3. FIG. 9 is a cross-sectional view along the line IX-IX' of FIG. 3.

A flat-type fluorescent lamp according to the present invention emits light from both sides thereof.

Referring to FIGS. 3 to 9, a flat-type fluorescent lamp 30 according to an embodiment of the present invention includes an upper glass substrate 40, a lower glass substrate 50, a spacer glass 70, first and second reflective sheets 71 and 72, side glasses 80, a plurality of first fluorescent substances 41 and a plurality of second fluorescent substances 51, and first and second sealants 42 and 52.

The upper glass substrate 40 is provided at a predetermined interval from the lower glass substrate 50. The spacer glass 70 is formed in a zigzag shape between the lower glass substrate 50 and the upper glass substrate 40. Then, the first and second reflective sheets 71 and 72 are respectively formed on upper and lower surfaces of the spacer glass 70, and the side glasses 80 are formed at sides of the upper and lower glass substrates 40 and 50. The plurality of first fluorescent substances 41 are formed on a surface of the upper glass substrates 40, and the plurality of second fluorescent substances 41 are formed on a surface of the lower glass substrates 50.

After that, the first and second sealants 42 and 52 are formed between the first and second fluorescent substances 41 and 51, respectively, to fix the spacer glass 70 to the upper and lower glass substrates 40 and 50. In addition, first and second electrode parts 60 and 61 are provided at both ends of the upper and lower glass substrates 40 and 50 along a longitudinal direction to apply a voltage. A discharge hole 43 is formed at one corner of the upper glass substrate 40 and is extended to the first fluorescent substance 41 formed on an inner surface of the upper glass substrate 40.

As illustrated in FIG. 9, the spacer glass 70 is in contact with the upper and lower glass substrates 40 and 50, whereby a plurality of discharge areas (channels), each having a triangular or inverse-triangular shape, are formed between the upper and lower glass substrates 40 and 50. The first and second fluorescent substances 41 and 51 respectively printed on inner surfaces of the upper and lower glass substrates 40 and 50 face the plurality of discharge areas. Then, the first and second sealants 42 and 52 are alternately printed on the upper and lower glass substrates 40 and 50. That is, the first sealant 42 is formed between each of the first fluorescent substances 41 formed on the upper glass substrate 40, and the second sealant 52 is formed between each of the second fluorescent substances 51 formed on the lower glass substrate 50.

The side glasses 80 are adhered to the upper and lower glass substrates 40 and 50 at a predetermined interval from the spacer glass 70 to assist in discharge. When there is no space formed between the side glasses 80 and the spacer glass 70, each discharge area requires one discharge hole, thereby complicating the structure of the backlight unit. The discharge hole 43 is also used to inject a gas and hydrargyrum after forming a vacuum state in each of the discharge areas.

To form the discharge areas in upper and lower directions, the spacer glass 70, a thickness of which is 1 mm or less, has a plurality of triangular shapes. When each of the upper and lower glass substrates 40 and 50 has a thickness of about 1 mm, a total thickness of the flat-type fluorescent lamp including the upper and lower glass substrates 40 and 50 is beneficially about 7 mm or less.

The first and second electrode parts 60 and 61 are formed of a silver paste beneficially including a low-temperature curing material. When a high-temperature curing material is included in such a silver paste, a curing process at a temperature of about 500° C. or more is required, which may damage the first and second fluorescent substances 41 and 51, the first and second sealants 42 and 52, and the upper and lower glass substrates 40 and 50. The first and second electrode parts 60 and 61 may be formed of a conductive metal material such as copper.

The first and second electrode parts 60 and 61 may be formed in a fixed frame to be connected with the lamp, as illustrated in FIG. 6A. When the lamp emits light, a large amount of heat is generated in the electrode parts. In order to dissipate the heat generated in the electrode parts, a plurality of holes 62 may be formed on surfaces of the first and second electrode parts 60 and 61, as illustrated in FIG. 6B.

As described above, the flat-type fluorescent lamp 30 emits light from both sides thereof where the spacer glass 70 is provided between the upper and lower glass substrates 40 and 50 to form the discharge areas. Also, the first and second reflective sheets 71 and 72 are formed on the upper and lower surfaces of the spacer glass 70, and the plurality of first and second fluorescent substances 41 and 51 are printed on the upper and lower glass substrates 40 and 50, respectively. Accordingly, visible light is emitted in both directions of the flat-type fluorescent lamp 30.

Figure 10:
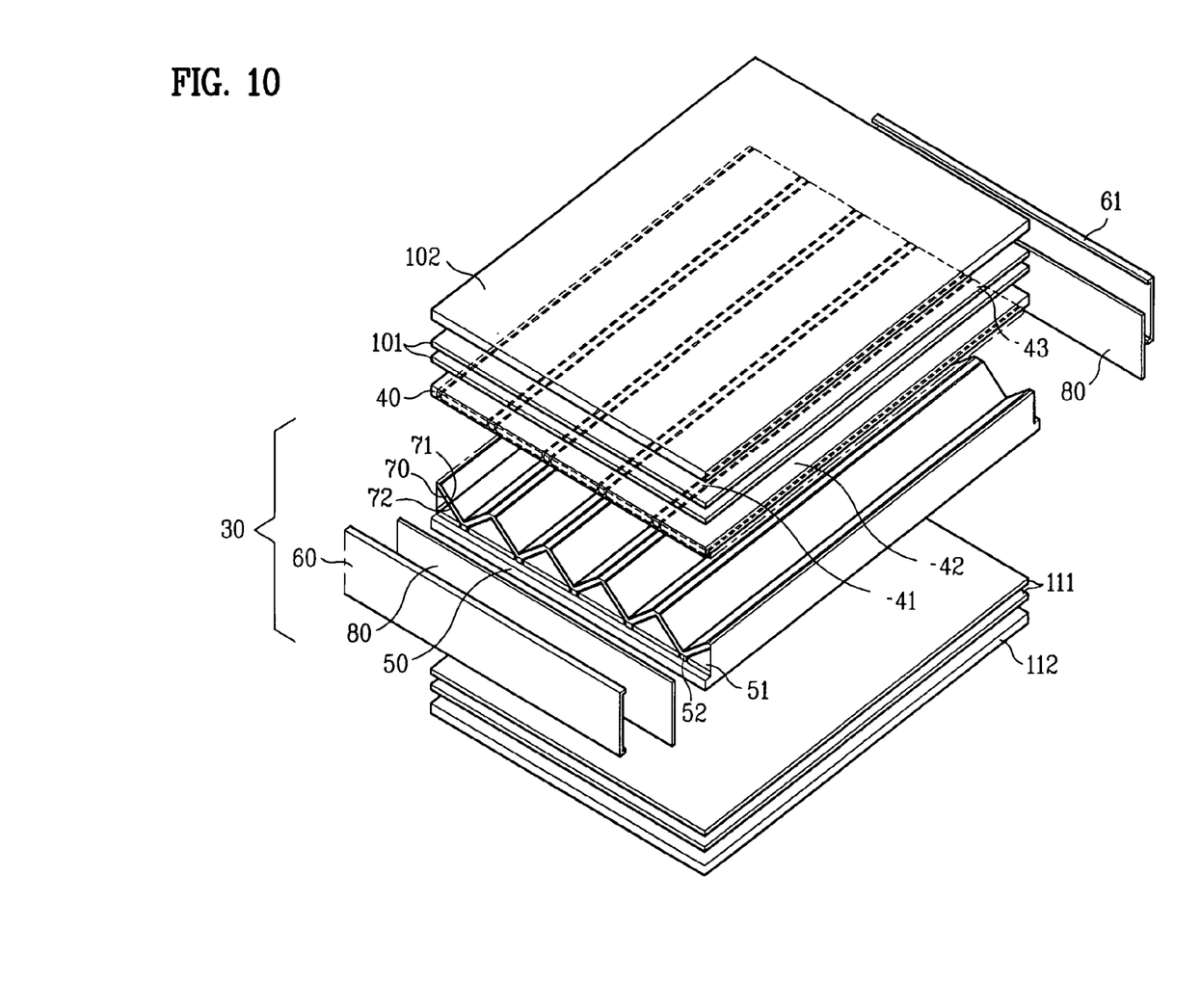
FIG. 10 is a perspective view illustrating a liquid crystal display (LCD) device that includes a flat-type fluorescent lamp according to an embodiment of the present invention.

A liquid crystal display (LCD) device that includes the aforementioned flat-type fluorescent lamp 30 will now be described. FIG. 10 is a perspective view illustrating an LCD device that includes a flat-type fluorescent lamp according to an embodiment of the present invention.

Referring to FIG. 10, a first light-scattering means 101 and a first LCD panel 102 are sequentially provided on the aforementioned flat-type fluorescent lamp 30. Also, a second light-scattering means 111 and a second LCD panel 112 are provided below the aforementioned flat-type fluorescent lamp 30.

With the first and second light-scattering means 101 and 111, the light generated from the flat-type fluorescent lamp 30 is uniformly provided to the display parts of the first and second LCD panels 102 and 112. To improve the light-scattering effect, a plurality of diffusion sheets and diffusion plate may be provided between the first and second LCD panels 102 and 112.

A flat-type fluorescent lamp and an LCD device having the same according to the present invention have the following advantages. First, a flat-type fluorescent lamp according to the present invention can be used as a high-luminance backlight source for large-sized display devices and does not require an additional prism sheet. Second, because a flat-type fluorescent lamp according to the present invention emits light in both directions, it can be used for display devices that can display images on both sides. Thus, the thickness of such dual-emission LCD devices can be reduced and the fabrication process becomes simple. Such dual-emission LCD devices can be effectively used for commercial purposes in public places.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A flat-type fluorescent lamp comprising:
   upper and lower glass substrates facing each other;
   a spacer glass having a zigzag shape between the upper and lower glass substrates for providing a plurality of discharge areas;
   first and second electrode parts at ends of the upper and lower glass substrates along a longitudinal direction thereof;
   first and second reflective sheets respectively formed on upper and lower surfaces of the spacer glass;
   a plurality of first fluorescent substances formed on the upper glass substrate and a plurality of second fluorescent substances formed on the lower glass substrate; and
   a side glass formed at a side of the upper and lower glass substrates, wherein the side glass is formed at a predetermined interval from the spacer glass such that the discharge areas are discharged through a space formed by the predetermined interval, and wherein the discharge areas are exposed to external through the space formed by the predetermined interval;
   wherein the upper glass substrate includes a plurality of first fluorescent substance and first sealants, each first fluorescent substance positioning between adjacent two first sealant;
   wherein a discharge hole is formed at one corner of the upper glass substrate and is extended to the first fluorescent substance;
   wherein the lower glass substrate includes a plurality of second fluorescent substance and second sealants, each second sealant positioning between adjacent two second fluorescent substance; and
   wherein the first and second sealants fix the spacer glass to the upper and lower glass substrates.

2. The flat-type fluorescent lamp of claim 1, wherein the spacer glass has a thickness of about 1 mm or less.

3. The flat-type fluorescent lamp of claim 1, wherein a thickness of the flat-type fluorescent lamp from a front surface of the upper glass substrate to a rear surface of the lower glass substrate is about 7 mm or less.

4. The flat-type fluorescent lamp of claim 1, wherein the first and second electrode parts are formed of a silver paste or a conductive metal material.

5. The flat-type fluorescent lamp of claim 1, wherein the first and second electrode parts include a low-temperature curing material.

6. A liquid crystal display (LCD) device comprising:
   a flat-type fluorescent lamp, wherein the flat type fluorescent lamp includes upper and lower glass substrates facing each other, a spacer glass having a zigzag shape between the upper and lower glass substrates for providing a plurality of discharge areas, first and second electrode parts at ends of the upper and lower glass substrates along a longitudinal direction thereof, first and second reflective sheets respectively formed on upper and lower surfaces of the spacer glass, and a plurality of first fluorescent substances formed on the upper glass substrate and a plurality of second fluorescent substances formed on the lower glass substrate; a side glass formed at a side of the upper and lower glass substrates, wherein the side glass is formed at a predetermined interval from the spacer glass such that the discharge areas are discharged through a space formed by the predetermined interval, and wherein the discharge areas are exposed to external through the space formed by the predetermined interval;
   a first light-scattering means and a first LCD panel over the flat-type fluorescent lamp;
   a second light-scattering means and a second LCD panel below the flat-type fluorescent lamp;
   wherein the upper glass substrate includes a plurality of first fluorescent substance and first sealants, each first fluorescent substance positioning between adjacent two first sealant;
   wherein a discharge hole is formed at one corner of the upper glass substrate and is extended to the first fluorescent substance;
   wherein the lower glass substrate includes a plurality of second fluorescent substance and second sealants, each second sealant positioning between adjacent two second fluorescent substance; and
   wherein the first and second sealants fix the spacer glass to the upper and lower glass substrates.

7. The LCD device of claim 6, wherein each of the first and second light-scattering means includes a plurality of diffusion sheets and diffusion plates.

8. The LCD device of claim 6, wherein the spacer glass has a thickness of about 1 mm or less.

9. The LCD device of claim 6, wherein a thickness of the flat-type fluorescent lamp from a front surface of the upper glass substrate to a rear surface of the lower glass substrate is about 7 mm or less.

10. The LCD device of claim 6, wherein the first and second electrode parts are formed of a silver paste or a conductive metal material.

11. The LCD device of claim 6, wherein the first and second electrode parts include a low-temperature curing material.

* * * * *